Feb. 3, 1970

S. T. CAP 3,493,959

INTERFEROMETRIC SHAFT ANGLE ENCODER HAVING
NATURAL BINARY READOUT

Filed June 23, 1966

INVENTOR.
STEVEN T. CAP
BY
*Robert J Haare*
ATTORNEY

Feb. 3, 1970

S. T. CAP 3,493,959

INTERFEROMETRIC SHAFT ANGLE ENCODER HAVING
NATURAL BINARY READOUT

Filed June 23, 1966

INVENTOR.
STEVEN T. CAP
BY
Robert J. Haase
ATTORNEY

United States Patent Office 3,493,959
Patented Feb. 3, 1970

3,493,959
INTERFEROMETRIC SHAFT ANGLE ENCODER HAVING NATURAL BINARY READOUT
Steven T. Cap, Farmingdale, N.Y., assignor to Sperry Rand Corporation, a corporation of Delaware
Filed June 23, 1966, Ser. No. 559,790
Int. Cl. H04l 3/00; H03k 13/00
U.S. Cl. 340—347                        8 Claims The invention herein described was made in the course of or under a contract or subcontract thereunder, with the Department of the Air Force.

The present invention generally relates to optical shaft angle encoders and, more particularly, to such an encoder whose resolution is greatly enhanced through the use of interferometric techniques.

There is a perpetual search for devices that can measure angular position to higher and higher degrees of resolution. For example, the star tracker of the recent past was required to yield angular position data with a resolution of from five to ten seconds of arc. Today, resolution goals are reaching toward one second of arc which is about one-millionth of 360 degrees. Such an increase in the required resolution of angular position measuring devices poses a very substantial problem especially in airborne or satellite-borne applications where the size of the measuring device must be constrained. A typical tolerable size for a shaft angle encoder mounted on a star tracker is of the order of a few inches in diameter.

A conventional shaft angle encoder comprises a glass disk having a photographic pattern consisting of a series of concentric rings. Each of the rings consists of alternate transparent and opaque portions of equal angular extent. The angular extent decreases in binary fashion as the distance of the ring from the center of the disk increases. Light from a slit lamp is passed through the transparent portions of the respective concentric rings along a given radius of the disk and through an indexing radial slit on the opposite side of the disk onto a bank of photocells. Each photocell responds to light transmitted through a transparent portion of a respective ring on the disk. When the transparent portion of a given ring is in registration with the radial slit lamp and the indexing radial slit, the photocell corresponding to that ring produces an output signal. Conversely, when an opaque portion of a given ring is in registration with the radial slit lamp and the indexing radial slit, the photocell corresponding to that ring produces no output signal. The outputs of all of the photocells represent the angular position of the disk in terms of a natural binary number.

The conventional optical encoder is satisfactory for use in encoding applications requiring limited resolution which is presently about $2^{13}$ incremental bits about the periphery of a 2″ disk. The limitation of resolution is imposed by the impracticability of "reading" the extremely small transparent and opaque portions of the highest order concentric ring. Misalignment of the radial slit lamp and of the index radial slit, non-linearity of the slits, the effects of diffraction, and the drastic reduction in light level associated with the extremely narrow slit sizes are factors which contribute to the ultimate resolution limitation of the conventional optical encoder.

Continuous improvements in the manufacture of optical encoder disks now make it possible to manufacture disks having a bit placement accuracy better than 0.2 second of arc on a 2″ disk. Many schemes have been imposed to extend or extrapolate the resolution of the optical encoder beyond about the aforementioned $2^{13}$ incremental bits but none is quite satisfactory. The state of the art is such that small sized optical encoder disks can be manufactured with greater accuracy in the placement of the transparent and opaque portions of the concentric rings than can be read out using conventional techniques.

One object of the present invention is to provide a displacement encoder making full use of the accuracy with which optical encoder diffraction gratings can be manufactured.

Another object is to provide an interferometric displacement encoder providing a very precise natural binary readout of displacement.

A further object is to provide a shaft angle encoder using interferometric techniques for providing very precise readout of angular position compatible with the natural binary readout of less precise conventional optical encoders.

These and other objects of the present invention, as will appear from a reading of the following specification, are accomplished in a preferred embodiment by the provision of a rotatable shaft supporting a glass disk on which a natural binary coded photographic pattern is placed. The photographic pattern consists of sixteen concentric rings each of which is alternately divided into transparent and opaque portions. The angular extent of the aforesaid portions varies inversely as the radius of their respective ring. The innermost fourteen tracks are read out in a conventional photodetector manner for coarse angular resolution. The two outermost concentric rings are illuminated by a source of coherent light to yield respective diffraction patterns. Each diffraction pattern consists of a plurality of orders which are optically conbined and photodetected in selected pairs to yield angular resolution at least $2^6$ times greater than the resolution afforded by the innermost fourteen rings. The state of each photodetector represents a respective bit of a binary number whose value is a measure of the angular position of the rotatable shaft. The source of coherent light preferably is a laser which optionally also may provide the illumination of the innermost fourteen rings as well as the outermost two rings.

Each of the innermost fourteen tracks of the binary coded photographic pattern corresponds to a respective single bit of the total binary representation of the angular position of the rotatable shaft. In accordance with the present invention, however, each of the two outermost tracks corresponds to a plurality of bits of the aforesaid binary number. Each bit derived from the outermost tracks corresponds to the combination of a respective pair of orders of a given diffraction pattern. For example, the combination (heterodyning) of the 0 and +1 orders of the diffraction pattern produced by the coherent illumination of the fifteenth track corresponds to the fifteenth bit of the total binary representation of shaft angle; the sixteenth bit corresponds to the combination of the +1 and −1 orders of the same diffraction pattern. In this manner, a total of six binary bits are derived from the two outermost tracks of the photographic pattern on the rotatable disk.

Analogous provision can be made in the present invention for the derivation of a number of binary bits in excess of the number of photographic tracks employed by combining (heterodyning) orders from different diffraction patterns. For example, the zero order from one diffraction pattern may be combined with the +1 order of the diffraction pattern produced by the adjacent track. Through the expedient of arranging the adjacent tracks so that the difference between the number of lines (opaque portions) on the two tracks is precisely equal to a given power of two, the photodetector receiving the adjacent track orders provides a binary output corresponding to a track having a number of lines equaling said given power of two. The power of two, of course, is a smaller number than the number of lines on either of the two tracks employed. This is in contradistinction to the result achieved by combining a plurality of orders from the same diffraction pattern. In the latter case, the photodetector receiving orders from the same given track provides a binary output corresponding to a track having a number of lines equalling an integral multiple of the number of lines on the single track employed. It should be noted that heterodyning orders from different diffraction patterns increases the numerical significance (weight) of the binary digit represented by the photodetector output whereas heterodyning orders from the same diffraction pattern decreases the numerical significance of the binary digit represented by the photodetector output.

For a more complete understanding of the present invention, reference should be had to the following specification and to the appended figures of which:

Figure 2:
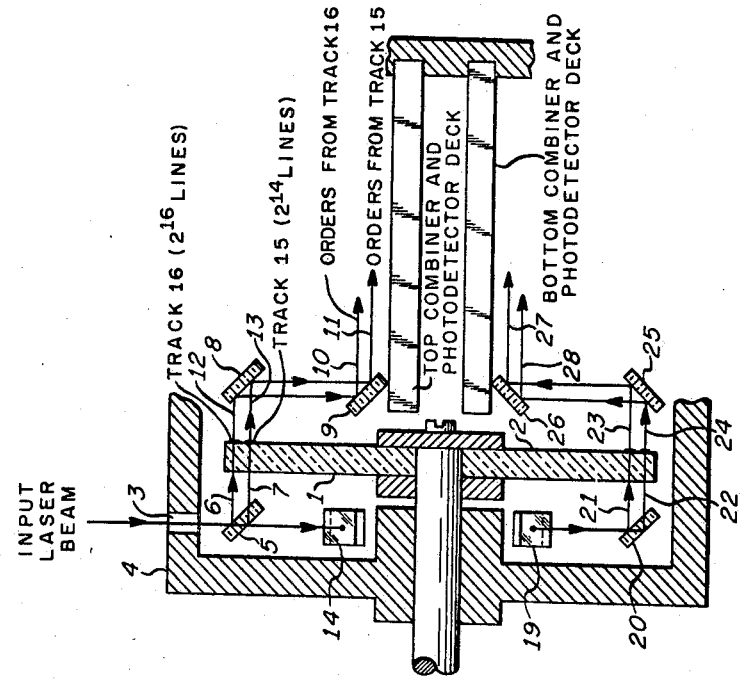
FIGURE 2 is a cross-sectional side view in simplified schematic form of the embodiment of FIGURE 1.

The present invention exploits the coherent properties of laser illumination to produce stable interference patterns from diffraction gratings. The diffraction gratings are provided by the two outermost tracks of a conventional type of optical shaft encoder photographic pattern. The pattern in the representative disclosed embodiment consists of sixteen concentric tracks which are divided into alternate transparent and opaque sections (lines) in a binary coded fashion. The innermost fourteen tracks are read out in a conventional fashion by means of respective photodetectors which can resolve the line spacings (distance between adjacent opaque portions of the given track) of the associated tracks. The minute line spacings of the outermost two of the sixteen tracks cannot be resolved in the same manner because of the onset of diffraction effects.

When a coherent (monochromatic and plane) wave strikes a reflecting surface whose length approaches the wavelength of the radiation, the wave is reflected over a relatively large agle. If two such radiators are placed in a plane, the reflection from each radiator alternately interferes with and reinforces that of the other so as to produce a diffraction pattern. As is well understood, the diffraction pattern consists of alternate light and dark regions. The light regions occur in locations in space where the reflection from each radiator differs from that of its neighbor by an integral number of wavelengths. Dark areas occur at locations in space where the difference in the aforesaid path lengths is an integral number of wavelengths minus one-half a wavelength. The diffraction pattern resulting from only two radiators is not sharp but rather is spread out in a sine wave intensity distribution. As the number of radiators is increased, however, the diffraction pattern becomes more sharply defined until, with a diffraction grating, the incident illumination is reflected in clearly defined narrow beams termed "orders." Thus, when the illumination from a laser beam is directed upon a diffraction grating such as each of the outermost two tracks, the beam is spread out into several clearly defined beams (orders) having approximately the same diameter as the incident beam.

Inasmuch as the beam from the laser is coherent and monochromatic, the diffracted beams also consist of coherent light which may be heterodyned against each other in a photodetector to produce beat frequencies. If a first order beam is heterodyned against a zero order beam from the same diffraction pattern, motion of the diffraction grating in a direction perpendicular to the incident laser beam produces a beat signal completing one cycle each time the diffraction grating moves through a distance equalling the line spacing of the grating. By heterodyning the +1 and −1 orders of a given diffraction pattern, a beat note is produced at a frequency twice the frequency of the first beat note. Similarly, the heterodyning of the +2 and −2 orders produces a beat note having a frequency four times that of the first beat frequency.

Figure 1:
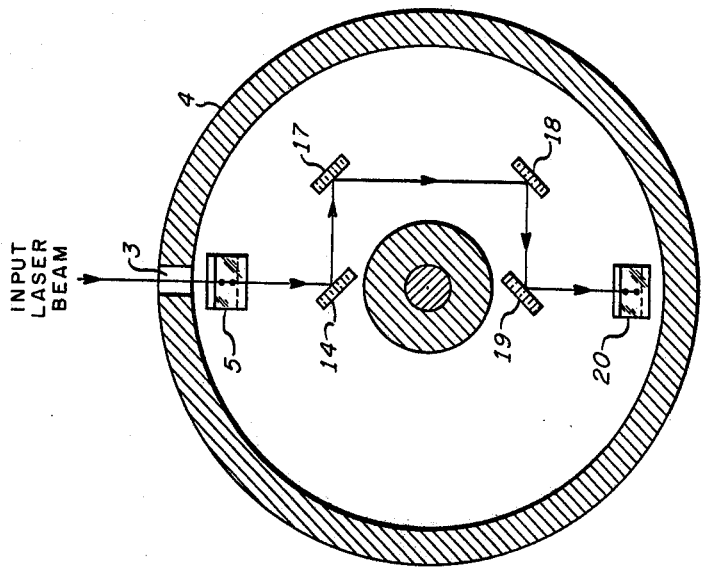
FIGURE 1 is a cross-sectional end view in simplified schematic form of a preferred embodiment of the invention.

The preceding concepts and principles are exploited in the preferred embodiment of the present invention represented in the figures. Referring to FIGURES 1 and 2, surface 2 of glass disk 1 is provided with a conventional natural binary coded photographic pattern. Sixteen tracks are utilized, by way of example, in the photographic pattern. The innermost fourteen tracks are illuminated and detected by conventional means which have been omitted from the simplified schematic representations of FIGURES 1 and 2 for the sake of simplicity and clarity. Each of the tracks, including the outermost tracks 15 and 16, consists of alternately transparent and opaque portions (lines). The spacing between the lines of track 15 and between the lines of track 16, however, is minute enough to cause the diffraction of an impinging laser beam. The input laser beam is derived from a laser source (not shown) and is directed through the aperture 3 in housing 4. The input laser beam then is directed by canted mirror 5 into parallel paths 6 and 7 by semi-reflective coatings on each of the front and back mirror surfaces. The light propagating along path 6 passes through track 16 of the photographic pattern on disk 1 whereas the light propagating along path 7 passes through track 15 when the transparent portions of the respective patterns are in registration with paths 6 and 7.

Each of the beams passing through the photographic diffraction gratings presented by tracks 15 and 16 is spread out (diffracted) into various orders of angular spacing depending upon the line spacing of the respective disk track. The two diffraction patterns fan-out in respective horizontal planes 12 and 13 which are vertically separated from each other by the radial spacing between tracks 15 and 16 on disk 1. The vertical spacing is preserved between the diffraction pattern planes as the beams are routed by mirrors 8 and 9 along planes 10 and 11.

A portion of the input laser beam is transmitted through mirror 5 and onto mirror 14 which redirects the beam around the hub of the shaft angle encoder with the aid of mirrors 17, 18 and 19. The beam reflected by mirror 19 is redirected by mirror 20 through tracks 15 and 16 of the photographic disk pattern along paths 21 and 22 diametrically opposite the position of paths 6 and 7. A pair of diffraction patterns are produced along planes 23 and 24 in the manner of the diffraction patterns produced along planes 12 and 13 and are redirected by mirrors 25 and 26 along planes 27 and 28. It will be noted that the binary coded photographic disk pattern is simultaneously illuminated by the laser beams at two diametrically opposite locations to provide a pair of diffraction patterns at each of said locations representing the angular position of the disk 2. Each pair of diffraction patterns is separately interpreted by respective apparatus represented in which can be averaged to yield a resultant number substantially unaffected by many of the errors in the optical and mechanical components. The apparatus for averaging the two binary numbers forms no part of the present invention and therefore has been omitted from the drawings.

Figure 3:
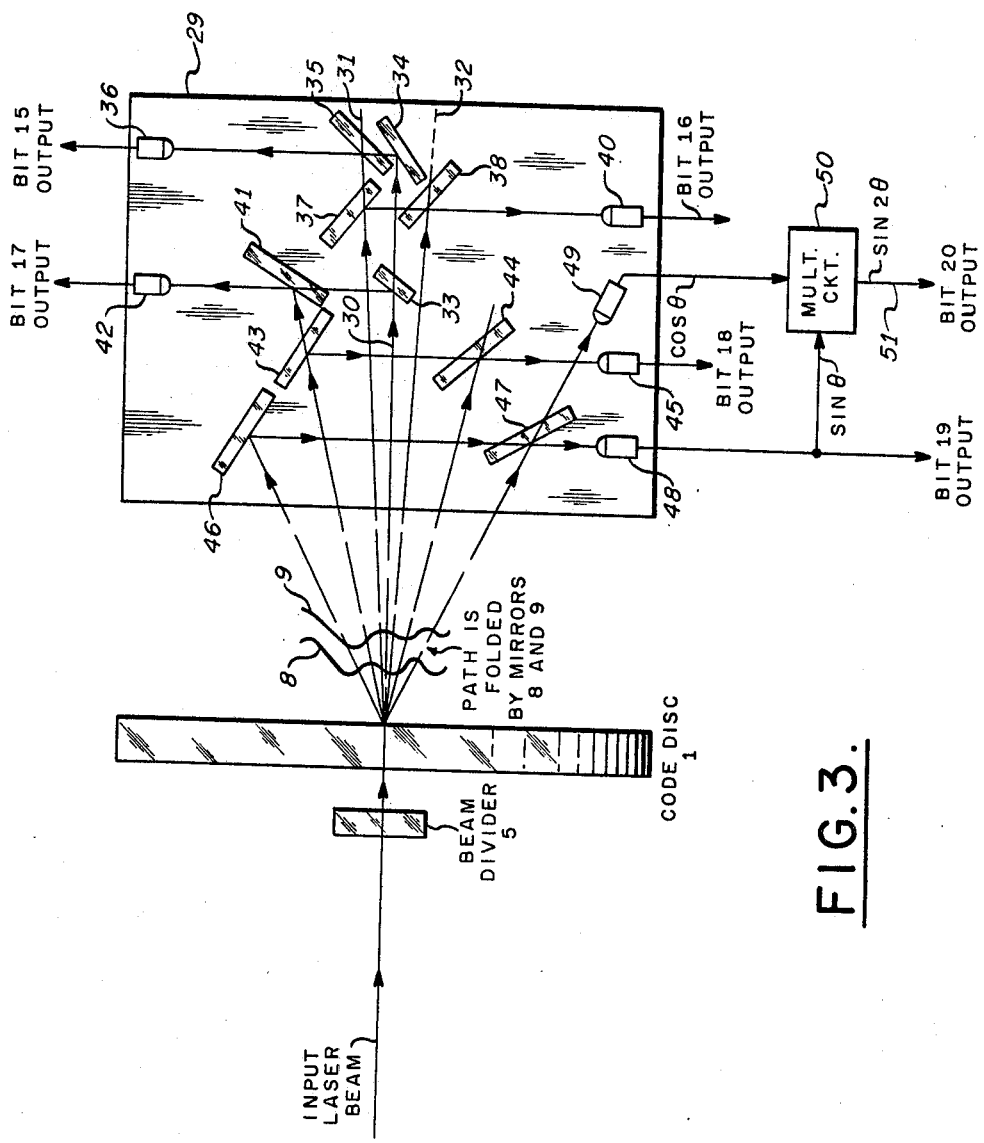
FIGURE 3 is a simplified schematic diagram of means for optically combining and photodetecting selected orders of the diffraction patterns produced by the apparatus of FIGURES 1 and 2.

FIGURE 3 is a plan view schematic diagram of apparatus for optically combining and photodetecting selected orders of the two diffraction patterns produced along planes 10 and 11 of FIGURE 2. Duplicate optical combining and photodetecting apparatus is employed with the two diffraction patterns produced along planes 27 and 28. The input laser beam is split by mirror 5 and directed through tracks 15 and 16 of the photographic pattern on surface 2 of code disk 1. Each emergent split beam is spread out into a plurality of directions (orders) comprising the resulting diffraction pattern, each pattern being vertically displaced from the other along planes 12 and 13 as shown in FIGURE 2. The vertical displacement between the track 15 and the track 16 diffraction patterns is maintained by mirrors 8 and 9 which redirect the diffraction patterns along planes 10 and 11. The various orders of the diffraction patterns propagating along planes 10 and 11 are intercepted by the mirrors and photodetectors comprising top combiner and photodetector deck 29 as shown in FIGURE 3.

The lower diffraction pattern of plane 11 (produced by track 15 of code disk 1) comprises the zero, +1 and −1 orders which are put to use and higher orders which are not utilized in the disclosed embodiment. The zero order is directed along line 30. The +1 order and −1 order lie along lines 31 and 32, respectively, which are displaced from each other by 6.7° in a typical case. The zero order of the track 15 diffraction pattern passes through semi-reflecting mirror 33 and onto mirror 34 which redirects said zero order through semi-reflecting mirro 35 onto photodetector 36. The +1 order of the track 15 diffraction pattern passes through semi-reflecting mirror 37 and is redirected by mirror 35 onto photodetector 36. Thus, the zero and +1 orders of the track 15 diffraction pattern are made collinear and coincident at the input of photodetector 36. The mirrors and the photodetector are so aligned that the central portion of the Fresnel interference pattern from the merged zero and +1 orders is incident at the aperture of photodetector 36.

When two beams from the desired diffraction orders are made collinear and coincident, they produce a Fresnel interference pattern (which resembles a bull's eye) because of the difference in wave front radii of curvature of the beams. The two different radii of curvature are the result of the different path lengths taken by each beam to reach the image plane where the Fresnel interference pattern is produced. The rotation of the binary coded photographic pattern on disk 1 causes the concentric rings of the Fresnel pattern to grow in diameter and move outwardly while new rings of growing diameter come into being at the center of the pattern. Motion of the disk in the opposite direction causes the Fresnel rings to decrease in diameter while new rings of shrinking diameter come into being at the periphery of the pattern. A photodetector placed in the Fresnel ring pattern, as photodetector 36 is placed at the center of the ring pattern resulting from the zero and +1 orders of the track 15 diffraction pattern, produces a binary signal which changes state as the ring pattern moves across the photodetector aperture. The photodetector produces a steady state output when code disk 1 is stationary depending upon whether the photodetector aperture intercepts a bright or a dark bank of the Fresnel ring pattern corresponding to the stationary position of the code disk.

In a typical embodiment, each photodetector has an effective aperture of approximately 0.03 inch whereby only the central portion of the Fresnel ring pattern is intercepted. Photodetector 36 provides the fifteenth bit of the total binary number representing the angular position of code disk 1. The output of photodetector 36 changes binary state each time that the disk is angularly displaced by an amount equalling the line spacing of track 15. Assuming that there are $2^{14}$ lines on track 15, the output of photodetector 36 changes binary state for every 39.55 seconds of arc of angular displacement of code disk 1.

The sixteenth bit of the total angular displacement binary word is obtained by combining the −1 and +1 orders of the track 15 diffraction pattern with the aid of mirrors 37 and 38. The +1 order along line 31 is reflected by semi-reflecting mirror 37 through semi-reflecting mirror 38 and onto detector 40. The −1 order of the same diffraction pattern is reflected by mirror 38 and made collinear and coincident with the +1 order at the aperture of photodetector 40. By virtue of the relationships existing among the various orders of a diffraction grating, the output of photodetector 40 (receiving +1 and −1 orders) changes state at twice the rate at which the output of photodetector 36 (receiving zero and +1 orders) changes state for a given angular displacement of code disk 1. Thus, the output of photodetector 40 is interpreted as the sixteenth bit of the total angular displacement binary number. No other orders of the track 15 diffraction patterns are utilized in the disclosed embodiment.

The track 16 diffraction pattern orders lie in plane 10 above the track 15 diffraction orders of plane 11 as shown in FIGURE 2. In a typical instance, planes 10 and 11 are separated by about 60 mils (the radial separation between tracks 15 and 16 on the photographic pattern). Hence, the zero orders of the two diffraction patterns can be distinguished one from the other by proper positioning of the respective photodetector apertures. The zero order of the track 16 diffraction pattern is reflected by mirror 33 and passes through semi-reflecting mirror 41 and onto photodetector 42. The 0.03″ aperture of photodetector 42 blocks the zero order track 15 diffraction pattern which is displaced 0.06″ below the track 16 zero order. The +1 order of the track 16 diffraction pattern passes through semi-reflecting mirror 43, is reflected by mirror 41 and is made collinear and coincident with the zero order to photodetector 42. The output of photodetector 42 represents the seventeenth bit of the total angular displacement binary number. This is the case where there are $2^{16}$ lines in track 16. The eighteenth bit of the total binary word is derived by combining the +1 and −1 orders of the track 16 diffraction pattern with the aid of mirrors 43 and 44 and photodetector 45 as shown in FIGURE 3 in a manner similar to that previously described. Likewise, the nineteenth bit is derived by combining the +2 and −2 orders of the track 16 diffraction pattern with the aid of mirrors 46 and 47 and photodetector 48.

The twentieth bit theoretically could be obtained by combining the +4 and −4 orders of the track 16 diffraction pattern but practical difficulties are encountered particularly because of the substantial reduction in the intensity of the diffraction orders above the second order. Alternatively, the nineteenth bit is derived from the +2 and −2 orders by exploiting a simple trigonometric relationship with the aid of photodetector 49 and multiplier circuit 59. The aperture of photodetector 48 is aligned with the central portion of the Fresnel "bulls eye" pattern impinging thereon whereas the aperture of photodetector 49 is displaced from said central portion by one-quarter of the distance between the adjacent rings of the Fresnel pattern which it receives. Both Fresnel patterns are of the same size and same binary bit significance inasmuch as both are formed by +2 and −2 orders of track 16 diffraction pattern. It should be noted that −2 order passes through mirror 47 onto photodetector 49 whereas the +2 order is reflected by mirror 46 and mirror 47 onto photodetector 49. Thus, the outputs of photodetectors 48 and 49 are 90° phase displaced with respect to each other and when multiplied in multiplier circuit 50 provided an output on line 51 having a transition rate twice that of the output of photodetector 48 or 49 alone in accordance with the expression $2 \sin \theta \cos \theta = \sin 2\theta$. An exclusive OR circuit is suitable for use as circuit 50. The output of multiplier circuit 50 on line 51 represents the twentieth bit which is the last bit of the total angular displacement binary number representing the position of code disk 1 in the preferred embodiment. The output on line 51 changes binary state for each 1.24 arc seconds of angular displacement of code disk 1.

It should be noted that the binary outputs provided by photodetectors 36, 40, 42, 45, 48 and by multiplier circuit 50 directly represent the values of respective bits of the total angular displacement binary number, these being bits fifteen through twenty. Bits one through fourteen, inclusive, are ascertained by conventional apparatus (not shown) using standard photodetector readout means capable of resolving the line spacings of the fourteen innermost tracks. Particular care must be exercised in the alignment of the conventional readout means associated with the innermost fourteen tracks having very close line spacing. Although careful attention to manufacturing tolerances will permit accurate read out of the innermost fourteen tracks of the photographic pattern on code disk 1, it may be desirable in certain applications to relax said tolerances without sacrifice of read out accuracy.

The present invention is readily adapted for the relaxation of manufacturing tolerances by permitting the synthesis of low order track (non-diffracting track) data while actually using higher order tracks having line spacings which cause diffraction of the impinging laser beam. For example, data derived normally from non-diffracting track 14 (having $2^{13}$ lines) can be synthesized through the use of two higher order tracks having even closer line spacings which diffract the impinging laser beam. One of the two higher order tracks in the given example contains $2^{15}+2^{13}$ lines while the other of the higher order tracks contains $2^{15}$ lines. By combining the $+1$ order from the diffraction pattern resulting from the $2^{15}$ line track with the $+1$ order from the diffraction pattern resulting from the $2^{15}+2^{13}$ line track, a Fresnel ring pattern results which fluctuates $2^{13}$ times for each revolution of code disk 1 thus providing the fourteenth bit of the total angular displacement binary number. It should be noted that in this modification of the present invention orders from two different diffraction patterns are combined at a single photodetector whereas in the embodiment shown in the drawings orders from the same diffraction pattern are combined at a single photodetector.

Although the presently preferred embodiment of the invention utilizes a laser as the source of coherent light for producing the interference patterns detected by the photocells, other light sources are suitable. It is only required that the coherence of the light source employed by commensurate with the difference between the path lengths of each of the orders impinging on a given photocell. The ultimate consideration is that the degree of coherence of the light source provides stable, well defined interference patterns which can be satisfactorily detected. It is in this context that the term "coherent" is utilized in the appended claims.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An interferometric displacement encoder comprising
   a plurality of diffraction gratings,
   a source of coherent light,
   means for directing said light on each of said gratings to produce a respective diffraction pattern having orders,
   means for optically combining seletced pairs of said orders, and
   means for photodetecting the combined selected orders.

2. An encoder as defined in claim 1 wherein the orders comprising one of said pairs of orders are from the same diffraction pattern.

3. An encoder as defined in claim 1 wherein the orders comprising one of said pairs of orders are from one diffraction pattern and the orders comprising another of said pairs of orders are from another diffraction pattern.

4. An encoder as defined in claim 1 wherein each of said diffraction gratings is a respective ring of a natural binary coded pattern.

5. An encoder as defined in claim 4 wherein said source of coherent light is a laser.

6. An encoder as defined in claim 4 wherein the orders comprising one of said pairs of orders are from the same diffraction pattern.

7. An encoder as defined in claim 4 wherein the orders comprising one of said pairs of orders are from one diffraction pattern and the orders comprising another of said pairs of orders are from another diffraction pattern.

8. An encoder as defined in claim 4 wherein said natural binary coded pattern is fixed to a rotatable transparent disk through which passes said coherent light.

References Cited

UNITED STATES PATENTS 3,419,330  12/1968  Schneider _____ 350—162

MAYNARD R. WILBUR, Primary Examiner

MICHAEL K. WOLENSKY, Assistant Examiner

U.S. Cl. X.R.

250—236, 237; 350—6, 162; 356—106, 107